US012807338B2

(12) United States Patent
Gokhale et al.

(10) Patent No.: US 12,807,338 B2
(45) Date of Patent: Nov. 24, 2026

(54) MULTI-ROTOR VEHICLE WITH PAYLOADS AT DIFFERENT VERTICAL HEIGHTS

(71) Applicant: ideaForge Technology Limited, Navi Mumbai (IN)

(72) Inventors: Shubhankar Gokhale, Navi Mumbai (IN); Piyush Divyajit, Navi Mumbai (IN)

(73) Assignee: ideaForge Technology Limited, Navi Mumbai (IN)

( * ) Notice: Subject to any disclaimer, the term of this patent is extended or adjusted under 35 U.S.C. 154(b) by 0 days.

(21) Appl. No.: 19/313,182

(22) Filed: Aug. 28, 2025

(65) Prior Publication Data

US 2026/0062154 A1 Mar. 5, 2026

(30) Foreign Application Priority Data

Aug. 29, 2024 (IN) ............................. 202421065351

(51) Int. Cl.
*B64U 10/14* (2023.01)
*B64U 20/80* (2023.01)

(52) U.S. Cl.
CPC ............. *B64U 10/14* (2023.01); *B64U 20/80* (2023.01)

(58) Field of Classification Search
CPC .... B64U 30/20; B64U 30/293; B64U 30/296; B64U 20/50; B64U 60/40; B64U 60/50; B64U 60/20; B64C 1/063; B64C 2211/00; B64C 25/10; B64C 25/12; B64C 2025/125
See application file for complete search history.

(56) References Cited

U.S. PATENT DOCUMENTS

| | | | | |
|---|---|---|---|---|
| 10,625,855 | B2 * | 4/2020 | Deng | B64C 39/024 |
| 11,319,046 | B2 * | 5/2022 | Harris | B64U 10/13 |
| 12,441,494 | B2 * | 10/2025 | Ho | B64U 30/293 |
| 12,522,383 | B2 * | 1/2026 | Bry | B64U 20/83 |
| 12,576,997 | B2 * | 3/2026 | Richmond | B64U 30/293 |
| 2018/0134369 | A1 * | 5/2018 | Tian | B64U 30/293 |
| 2018/0297716 | A1 * | 10/2018 | Ni | G05D 1/0094 |
| 2019/0185169 | A1 * | 6/2019 | Xu | H01M 10/0587 |
| 2020/0285251 | A1 * | 9/2020 | Anishchenko | B64U 50/13 |
| 2021/0214068 | A1 * | 7/2021 | Bry | B64U 20/83 |
| 2024/0228075 | A9 * | 7/2024 | Xiao | B64U 10/14 |
| 2026/0048861 | A1 * | 2/2026 | Ho | B64U 20/50 |
| 2026/0091890 | A1 * | 4/2026 | Xiao | B64U 10/14 |

FOREIGN PATENT DOCUMENTS

CN 118405285 A * 7/2024 ............. B64D 35/08

* cited by examiner

*Primary Examiner* — Arfan Y. Sinaki
(74) *Attorney, Agent, or Firm* — Renner, Otto, Boisselle & Sklar, LLP

(57) ABSTRACT

An aerial vehicle (100) comprises a fuselage (102) having a front end (102*a*), a rear end (102*b*), and a central axis (X-X') passing through a centroid of the fuselage (102) and extending between the front end (102*a*) and the rear end (102*b*). The aerial vehicle (100) comprises a pair of front rotor arms (104) pivotally coupled to the left side (102*c*) and right side (102*d*) of the fuselage (102) close to the front end (102*a*) of the fuselage (102). Further, a pair of rear rotor arms (106) is pivotally coupled to the left side (102*c*) and right side (102*d*) of the fuselage (102) close to the rear end (102*b*) of the fuselage (102). Planes (ABCD, A'B'C'D') of rotational movement of the pair of front rotor arms (104) and the rear rotor arms (106) are at an angle to the central axis (X-X') of the fuselage (102).

10 Claims, 8 Drawing Sheets

MULTI-ROTOR VEHICLE WITH PAYLOADS AT DIFFERENT VERTICAL HEIGHTS

TECHNICAL FIELD

The present disclosure relates generally to the field of aerial vehicles. In particular, the present disclosure pertains to a multi-copter helicopter with foldable rotor arms.

BACKGROUND

Background description includes information that may be useful in understanding the present invention. It is not an admission that any of the information provided herein is prior art or relevant to the presently claimed invention, or that any publication specifically or implicitly referenced is prior art.

Existing multi-rotor aerial vehicle comprise several groups of propellers or rotors which are distributed in a certain arrangement. The propellers are secured to arms, and the arms are connected with a fuselage. The known layout has a large size, making it cumbersome to handle the aerial vehicle when being moved from one place to other or being stored.

There is, therefore, a need to overcome the above-mentioned drawbacks, shortcomings, and limitations associated with the existing multi-rotor aerial vehicles, by providing an improved arrangement of the rotors and corresponding arms.

OBJECTIVES OF THE INVENTION

A general objective of the present disclosure is to overcome the problems associated with the existing multi-rotor aerial vehicles.

An objective of the present disclosure is to provide an improved multi-rotor aerial vehicle that is easier to handle during transportation and packaging.

Another objective of the present disclosure is to reduce drag on the aerial vehicle during cruising, thereby enhancing efficiency and range of the vehicle.

Another objective of the present disclosure is to enhance overall stability of the aerial vehicle during take-off, landing and hovering.

SUMMARY

Aspects of the present disclosure relate generally to the field of aerial vehicles. In particular, the present disclosure pertains to a multi-copter aerial vehicle with foldable rotor arms and tilted fuselage that makes the aerial vehicle compact and more efficient and stable during flight.

According to an aspect, the proposed aerial vehicle comprises a fuselage having a front end, a rear end, and two mutually opposed sides comprising a left side and a right side, and extending between the front end and the rear end. The aerial vehicle comprises a central axis passing through a centroid of the fuselage and extending between the front end and the rear end. The aerial vehicle comprises a pair of front rotor arms pivotally coupled to the left side and right side of the fuselage close to the front end of the fuselage. Further, the aerial vehicle comprises a pair of rear rotor arms pivotally coupled to the left side and right side of the fuselage close to the rear end of the fuselage. The pivotal coupling of the front rotor arms and the rear rotor arms to the respective sides of the fuselage is such that planes of rotational movement of the pair of front rotor arms and the rear rotor arms are at an angle to the central axis of the fuselage.

In one or more embodiments, the aerial vehicle can include landing gears configured such that when the aerial vehicle is on ground, the planes of rotational movement of the pair of front rotor arms and the rear rotor arms are parallel to the ground.

In one or more embodiments, the aerial vehicle can include a pair of front landing gears provided close to the front end of the fuselage and a pair of rear landing gears provided close to the rear end of the fuselage. The front landing gears may be longer than the rear landing gears such that, when the aerial vehicle is on ground, the front end of the fuselage may be higher than the rear end, and the planes of rotational movement of the pair of front rotor arms and the rear rotor arms are parallel to the ground.

In one or more embodiments, the plane of rotational movement of the pair of front rotor arms may be located above the plane of rotational movement of the pair of rear rotor arms.

In one or more embodiments, each of the front rotor arms and the rear rotor arms may be configured to be rotated between an active position, in which rotors on the respective rotor arm is operated for operation of the aerial vehicle, and a folded position, in which the aerial vehicle may be packed and transported.

In one or more embodiments, for moving the rotor arms to the folded position, the front rotor arms may be configured to be rotated towards the rear end of the fuselage. Further, the rear rotor arms may be configured to be rotated towards the front end of the fuselage, such that, in the folded position, the front rotor arms may be located parallel to and above the rear rotor arms, on the two sides of the fuselage.

In one or more embodiments, each of the rotor arms may include at least one rotor. The rotor may be attached to the respective rotor arm in a downward direction.

In one or more embodiments, the fuselage may include a mounting frame configured at the rear end of the fuselage. The mounting frame may be parallel to the planes of rotational movement of the pair of front rotor arms and the rear rotor arms. The mounting frame may be configured to mount a plurality of sensors.

In one or more embodiments, the front landing gears and the rear landing gears may be foldable/retractable.

In another aspect, the present disclosure pertains to an aerial vehicle, having a front end, a rear end. The aerial vehicle comprises a central axis passing through a centroid of the fuselage and extending between the front end and the rear end. The aerial vehicle comprises a plurality of rotor arms connected to the fuselage. The plurality of rotor arms comprise at least one pair of front rotor arms connected to the fuselage close to the front end of the fuselage. Further, the plurality of rotor arms comprise at least one pair of rear rotor arms connected to the fuselage close to the rear end of the fuselage. Further, the aerial vehicle includes at least two payloads located on the fuselage in spaced apart locations between the front end and the rear end of the fuselage resulting the two payloads to be located at different vertical heights.

In one or more embodiments, the two payloads may include a primary payload and a secondary payload. The primary payload may be mounted at the front end of the fuselage. Further, the secondary payload may be mounted at a bottom side of the fuselage near a Centre of Gravity (COG) of the fuselage.

In one or more embodiments, the primary payload may be an imaging sensor and the secondary payload may include, but is not limited to, the imaging sensor like a daylight or thermal imaging camera, LiDAR, radar, or a cargo/deliverable payload, and location of the two payloads at different vertical heights prevents obstruction of the field of view of the secondary payload by the primary payload.

In one or more embodiments, the connection of the front rotor arms and the rear rotor arms to the respective sides of the fuselage may be such that planes of rotational movement of the pair of front rotor arms and the rear rotor arms may at an angle to the central axis of the fuselage. Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Embodiments explained herein relate to an improved, and compact aerial vehicle, which can facilitate reduction is size and weight of a fuselage, and better mechanical structural integrity with enhanced control and stability to the aerial vehicle.

Figure 1A:
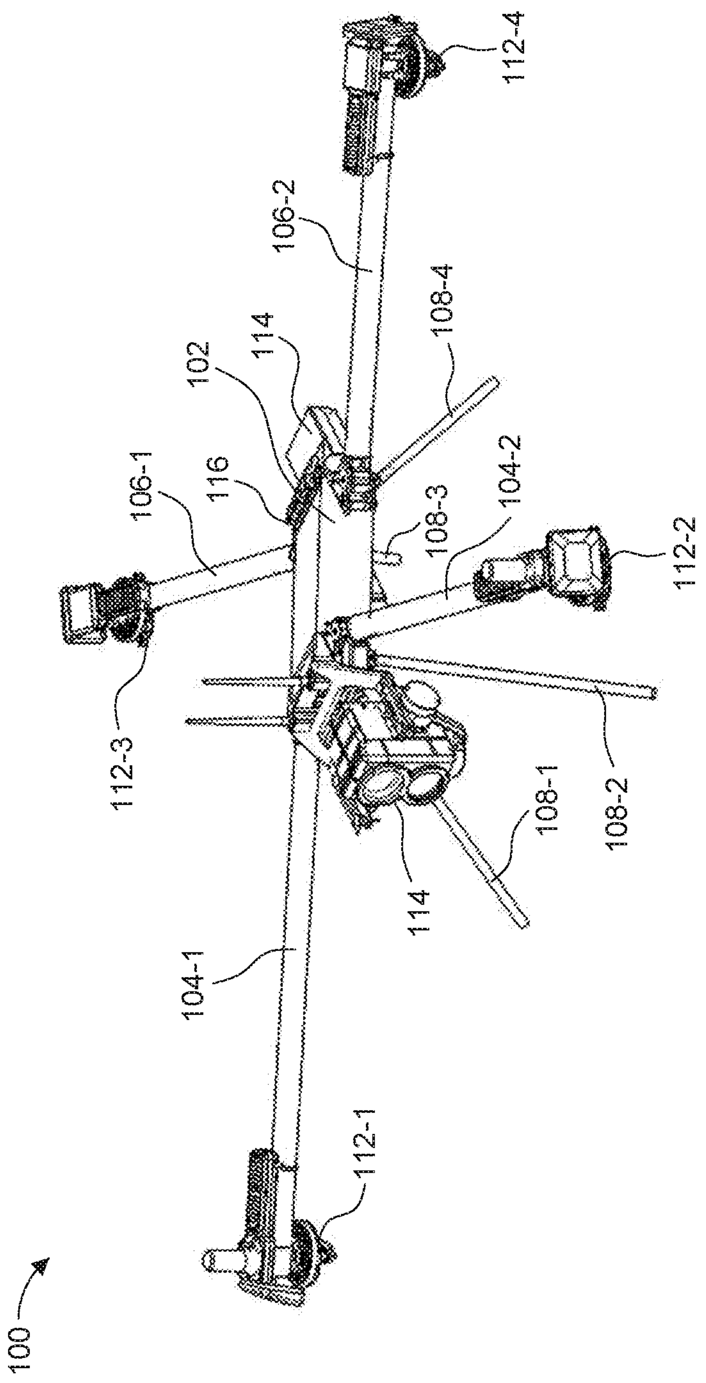
FIG. 1A illustrates an exemplary isometric view of a proposed aerial vehicle, in accordance with an embodiment of the present disclosure.

Referring to FIGS. 1A to ID, the proposed aerial vehicle 100, especially a multi-copter helicopter, includes a fuselage 102 having a front end 102*a*, a rear end 102*b*, and two mutually opposed sides comprising a left side 102*c* and a right side 102*d*, and extending between the front end 102*a* and the rear end 102*b*. The aerial vehicle 100 includes a central axis passing through a centroid of the fuselage 102 and extending between the front end 102*a* and the rear end 102*b*. The fuselage 102 can include a mounting frame 110. The mounting frame 110 can be configured at the rear end 102*b* of the fuselage 102. Further, the mounting frame 110 can configured to mount a plurality of sensors. The plurality of sensors can include but not limited to inertial measurement units (IMU), gyroscopes, accelerometers, magnetometers, barometers, distance sensors, temperature sensors, and Light Detecting and Ranging (LiDAR) sensors. Furthermore, an imaging device 114 can be configured at the front end 102*a* of the fuselage 102. The imaging device 114 can be configured to detect obstacle in a path defined for flying of the aerial vehicle 100.

In an embodiment, the fuselage 102 can include a removable saddle 116 configured within the fuselage 102. The removable saddle 116 can be configured to house batteries, and avionic components of the aerial vehicle 100. The avionic components can include but not limited to a flight controller, actuators, a pair of telemetry, a receiver, a Geographical Positioning System (GPS) module, and the like. The flight controller can monitor and control factors such as but not limited to a rotor speed, direction of the plurality of rotor arms, direction and movement of the camera, based on received one or more data from the plurality of sensors. The one or more data can include but not limited to an angular speed, an altitude, an orientation of the aerial vehicle 100, and position of the detected obstacles.

The aerial vehicle 100 includes a pair of front rotor arms 104-1, 104-2 (collectively referred herein as 104) pivotally coupled to the left side 102*c* and right side 102*d* of the fuselage 102 close to the front end 102*a* of the fuselage 102. Further, the aerial vehicle 100 includes a pair of rear rotor arms 106-1, 106-2 (collectively referred herein as 106) pivotally coupled to the left side 102*c* and right side 102*d* of the fuselage 102 close to the rear end 102*b* of the fuselage 102. The pivotal coupling of the front rotor arms 104 and the rear rotor arms 106 to the respective sides 102*c*, 102*d* of the fuselage 102 is such that planes ABCD, A'B'C'D' of rotational movement of the pair of front rotor arms 104 and the rear rotor arms 106 are at an angle to the central axis X of the fuselage 102.

A person skilled in the art would appreciate the placement of the front and rear rotor arms 104, 106 closer to the central axis of the fuselage 102, which results in lowering of a centre of gravity of the aerial vehicle 100. Thus, lowering of the centre of gravity can reduce torsional stress and shear stress acting on the fuselage 102. Thus, enhancing the overall stability of the aerial vehicle 100, especially during take-off, landing and hovering.

In addition, placing the rotor arms 104, 106 on the centreline of the fuselage 102 can help in creating a more symmetrical and balanced distribution of forces, thereby reducing the torsional stress on the fuselage 102.

In an embodiment, the plane ABCD of rotational movement of the pair of front rotor arms 104 can be located above the plane A'B'C'D' of rotational movement of the pair of rear rotor arms. Each of the front and rear rotor arms 106 can include at least one rotor 112-1, 112-2, 112-3, and 112-4 (collectively referred herein as 112), where the rotor 112 can be attached to the respective rotor arm in a downward direction.

It can also be appreciated that forces generated by the rotors 112 can be applied closer to a structural centre of the fuselage 102, hence reducing the shear stress acting on the fuselage 102. Further, reducing a vertical gap between the plane ABCD of rotational movement of the pair of front rotor arms 104, and the plane A'B'C'D' of rotational movement of the pair of rear rotor arms 106 can improve stability and control of the aerial vehicle 100. Furthermore, placing the rotor arms 104, 106 closer to the centreline of the fuselage 102, places the rotors 112 closer to the centreline, thus facilitate balancing of a thrust generated by the rotors 112. The balanced thrust distribution can allow for more precise control over the orientation and motion of the aerial vehicle 100, thereby improving manoeuvrability, responsiveness, and agility, enabling the aerial vehicle 100 to perform complex aerial maneuvers with greater ease and precision.

In an embodiment, the mounting frame 110 can be parallel to the planes ABCD, A'B'C'D' of rotational movement of the pair of front rotor arms 104 and the rear rotor arms.

In an embodiment, the aerial vehicle 100 can include landing gears 108-1, 108-2, 108-3, and 108-4 (collectively referred herein as 108). The landing gears 108 can be configured such that when the aerial vehicle 100 is on ground, the planes ABCD, A'B'C'D of rotational movement of the pair of front rotor arms 104 and the rear rotor arms 106 can be parallel to the ground. The landing gears 108 can include a pair of front landing gears 108-1, 108-2 provided close to the front end 102*a* of the fuselage 102, and a pair of rear landing gears 108-3, 108-4 provided close to the rear end 102*b* of the fuselage 102. Further, the pair of front landing gears 108-1, 108-2 can be longer than the pair of rear landing gears 108-3, 108-4. When the aerial vehicle 100 is on ground, the front end 102*a* of the fuselage 102 can be higher than the rear end 102*b*, and the planes ABCD, A'B'C'D' of rotational movement of the pair of front rotor arms 104 and the rear rotor arms 106 can be parallel to the ground. In an embodiment, the plane ABCD of rotational movement of the pair of front rotor arms 104 can be located above the plane A'B'C'D' of rotational movement of the pair of rear rotor arms 106.

In an embodiment, each of the front rotor arms 104 and the rear rotor arms 106 can be configured to be rotated between an active position, and a folded position. In the active position, rotors 112 on the respective rotor arms 104, 106 can be operated for operation of the aerial vehicle 100. In the folded position, the aerial vehicle 100 can be packed and transported. In the active position, the fuselage is tilted.

Referring to FIGS. 2A to 2D, various views of the aerial vehicle 100, in a folded position are disclosed. For moving the rotor arms 104, 106 to the folded position, the front rotor arms 104 can be configured to be rotated towards the rear end 102*b* of the fuselage 102. Further, the rear rotor arms 106 can be configured to be rotated towards the front end 102*a* of the fuselage 102, such that, in the folded position, the front rotor arms 104 can be located parallel to and above the rear rotor arms, on the two sides 102*c*, 102*d* of the fuselage 102. Further, the front landing gears 108-1, 108-2 and the rear landing gears 108-3, 108-4 can be foldable/retractable.

Even in the folding position, the fuselage 102 can be configured such that planes ABCD, A'B'C'D' of rotational movement of the pair of front rotor arms 104 and the rear rotor arms 106 can be at the angle to the central axis X-X' of the fuselage 102. The fuselage 102 can be in tilted position in the active and the folded position. Moreover, the rotors 112 can be attached to the respective rotor arm in the downward direction, even in the folding position.

Those skilled in the art would appreciate that the proposed aerial vehicle 100 in which the rotor arms 104, 106 are placed closer to the centreline of the fuselage 102, thereby providing better mechanical structural integrity, reduces size and weight of the fuselage 102, and enhances control and stability of the aerial vehicle 100.

Figure 1B:
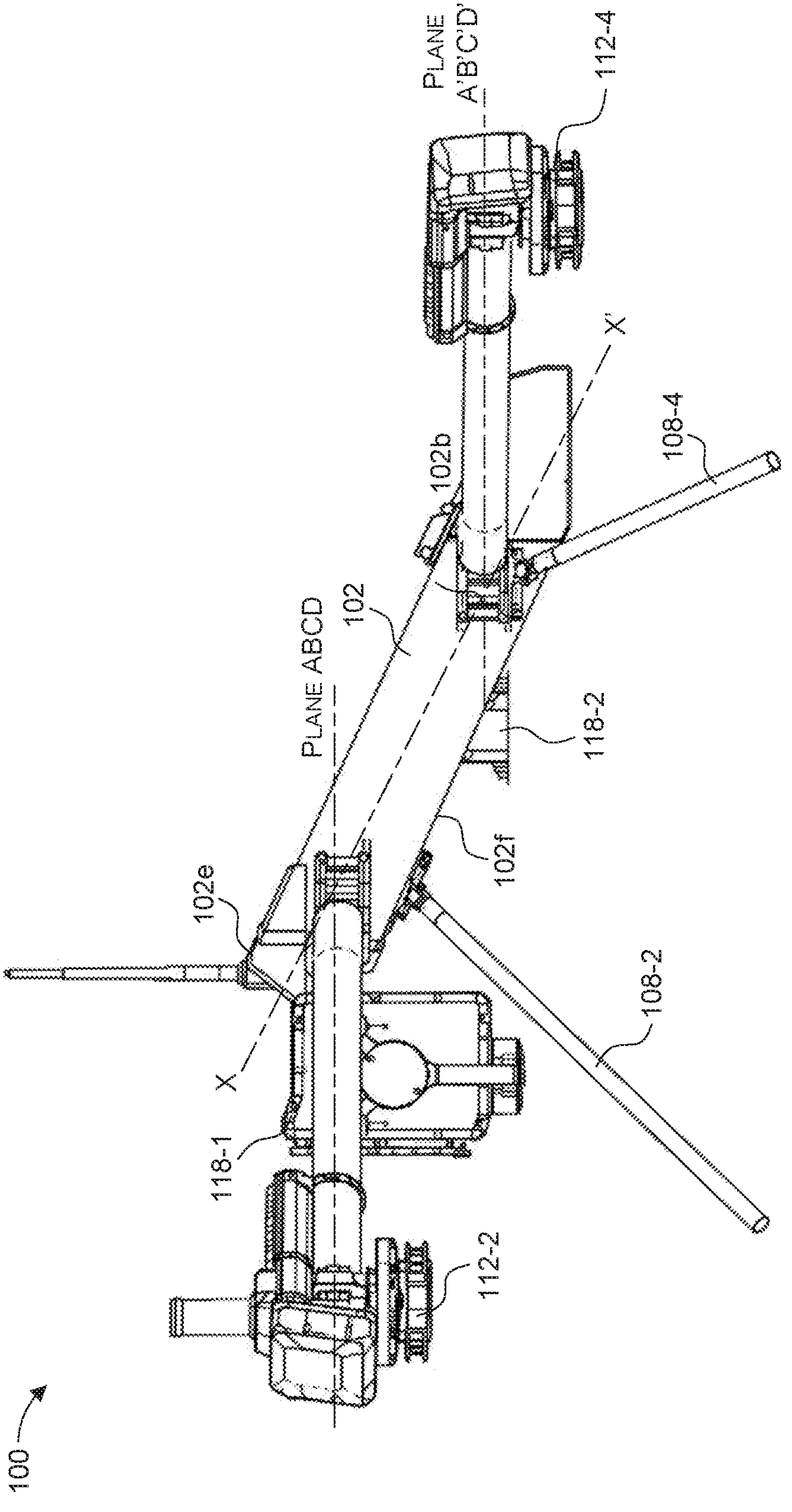
FIG. 1B illustrates an exemplary side view of the proposed aerial vehicle of FIG. 1A, mounted with at least two payloads, in accordance with an embodiment of the present disclosure.
Figure 1C:
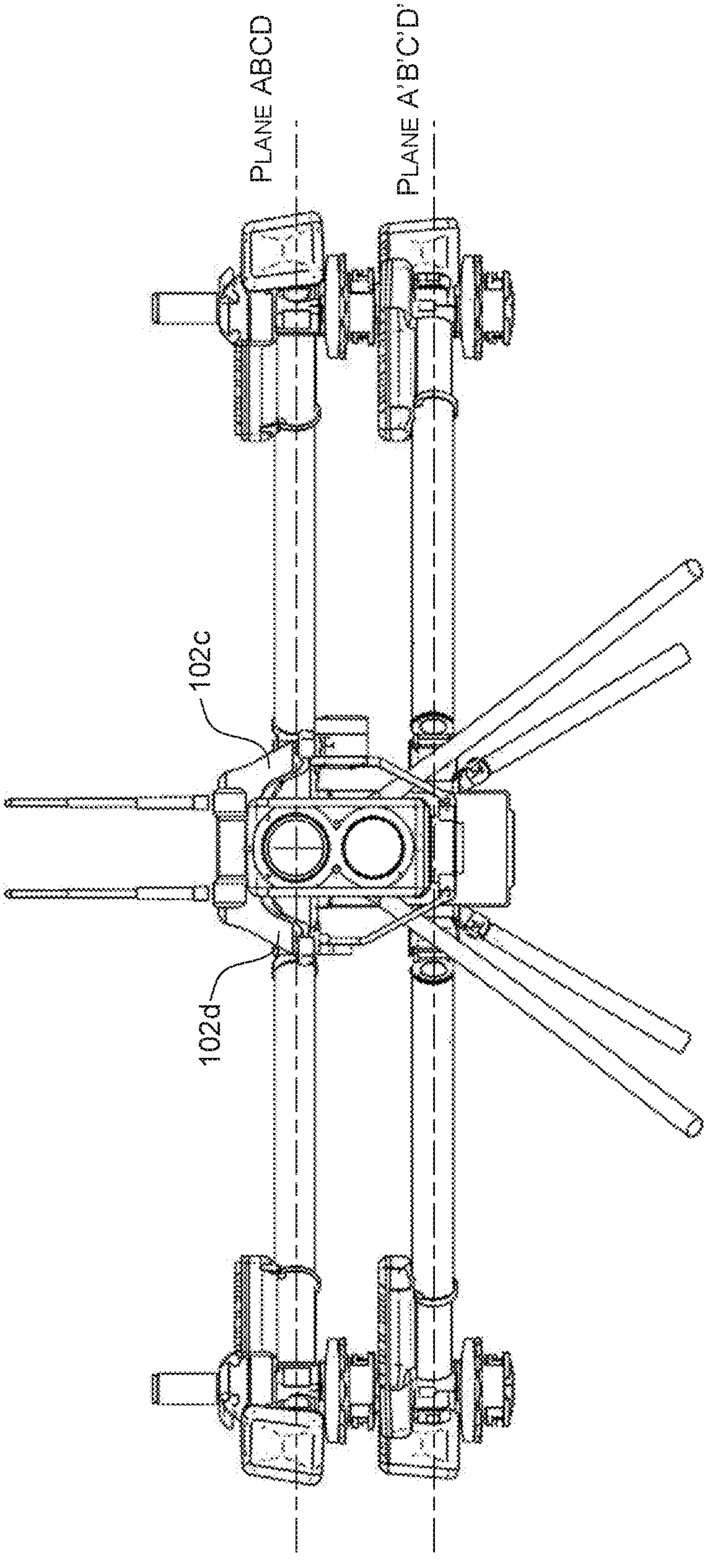
FIG. 1C illustrates an exemplary front view of the proposed wheel of FIG. 1A, in accordance with an embodiment of the present disclosure.
Figure 1D:
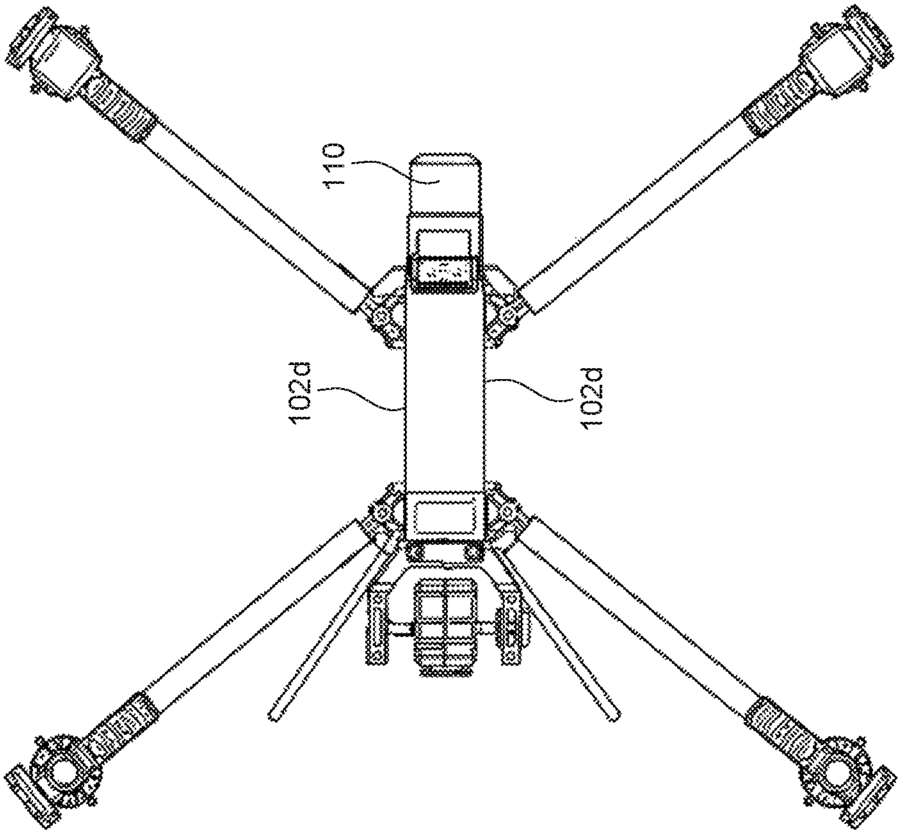
FIG. 1D illustrates another exemplary top view of the proposed wheel of FIG. 1A, in accordance with an embodiment of the present disclosure.
Figure 2A:
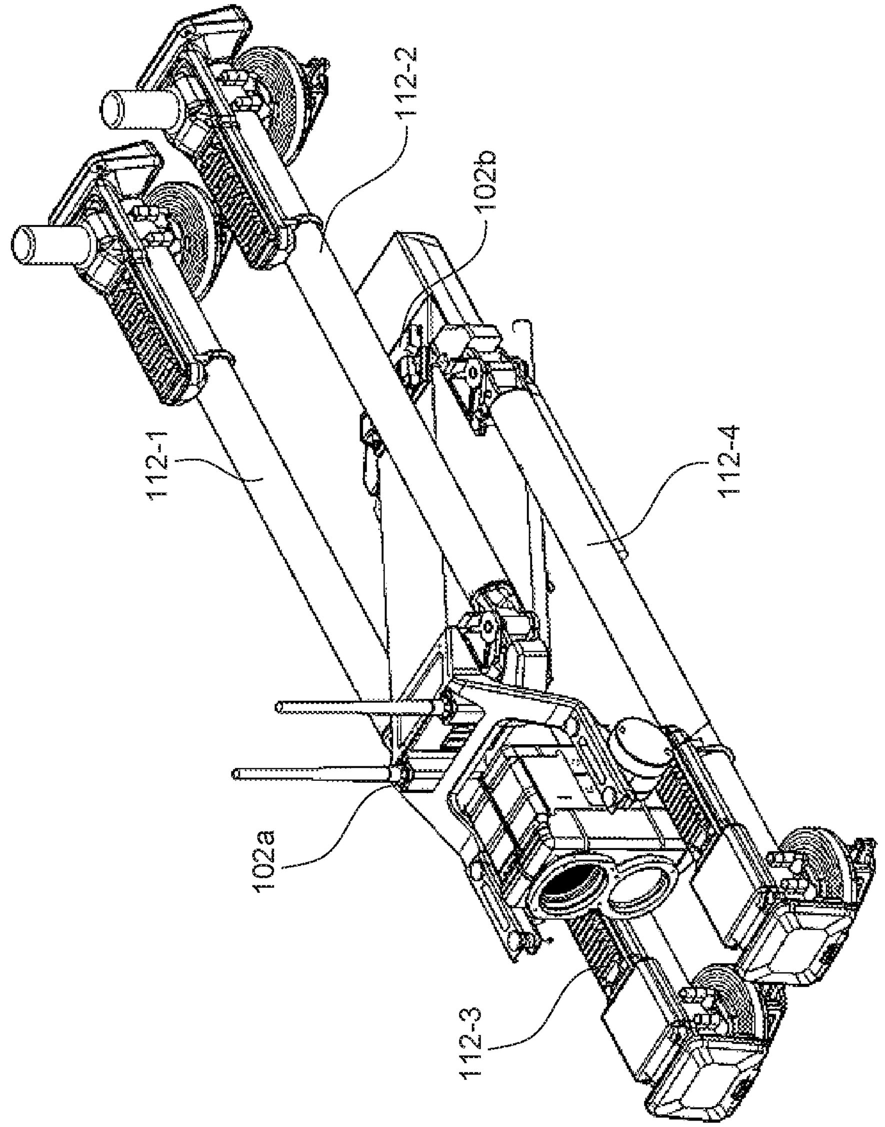
FIG. 2A illustrates an exemplary isometric view of a proposed aerial vehicle of FIG. 1A in a folded position, in accordance with an embodiment of the present disclosure.
Figure 2B:
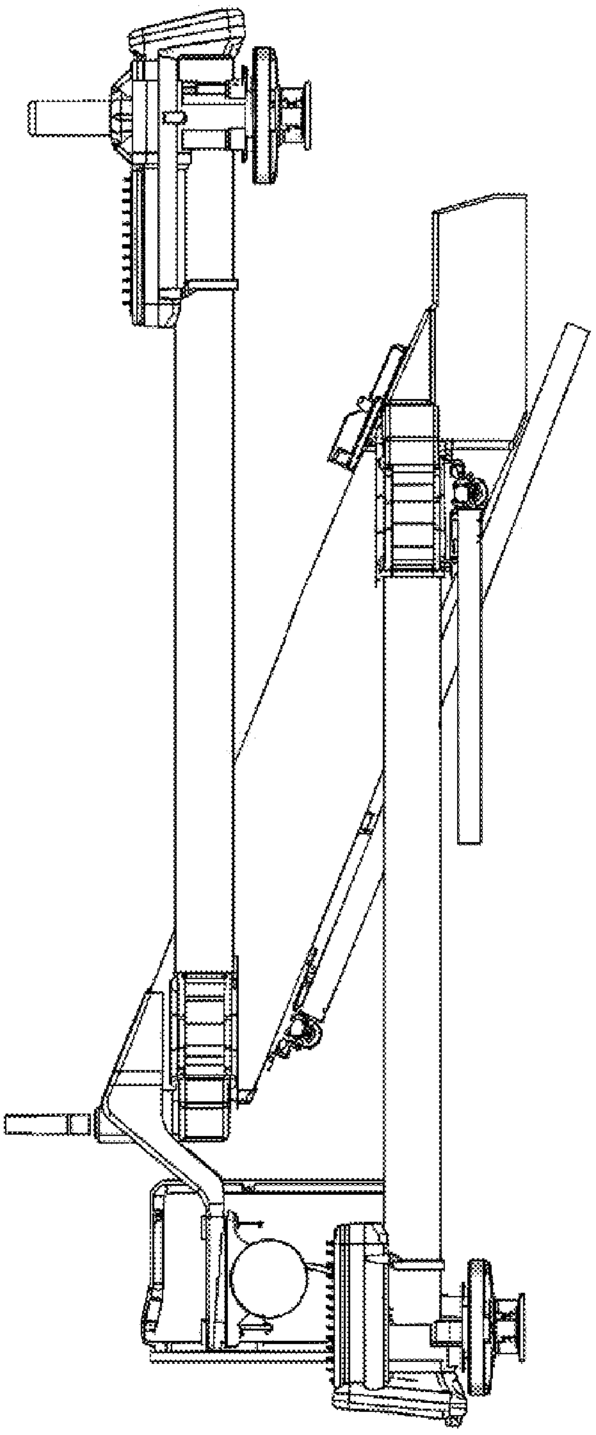
FIG. 2B illustrates an exemplary side top view of a proposed aerial vehicle of FIG. 2A, in accordance with an embodiment of the present disclosure.
Figure 2C:
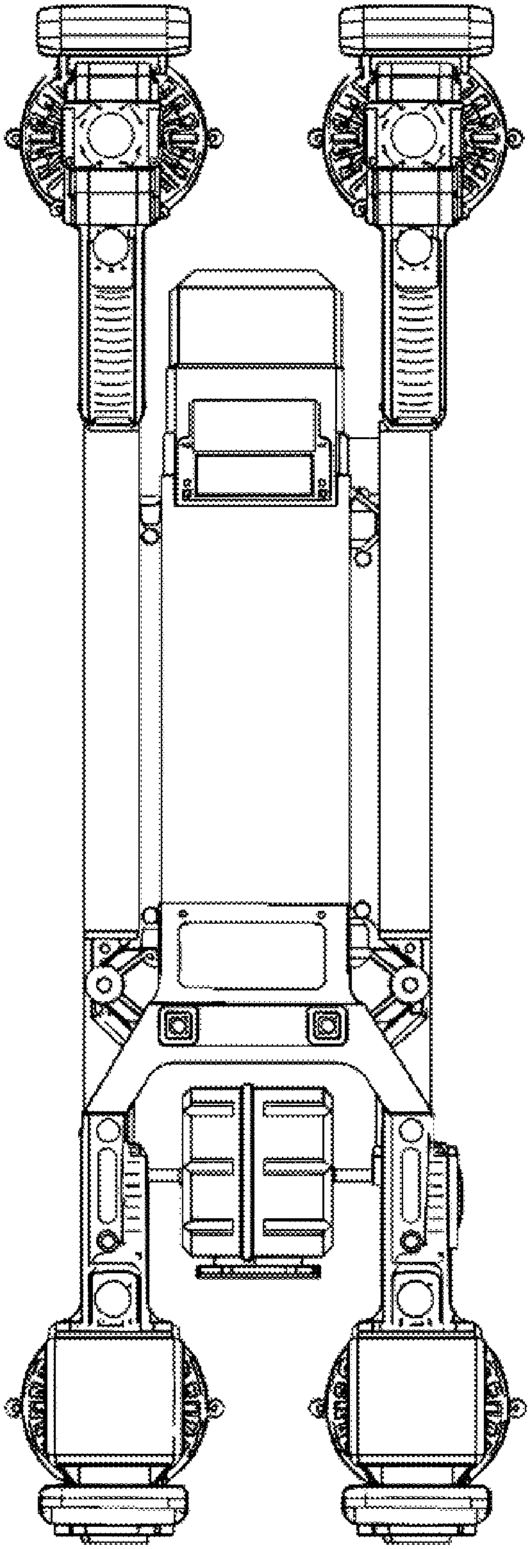
FIG. 2C illustrates an exemplary top view of a proposed aerial vehicle of FIG. 2A, in accordance with an embodiment of the present disclosure.
Figure 2D:
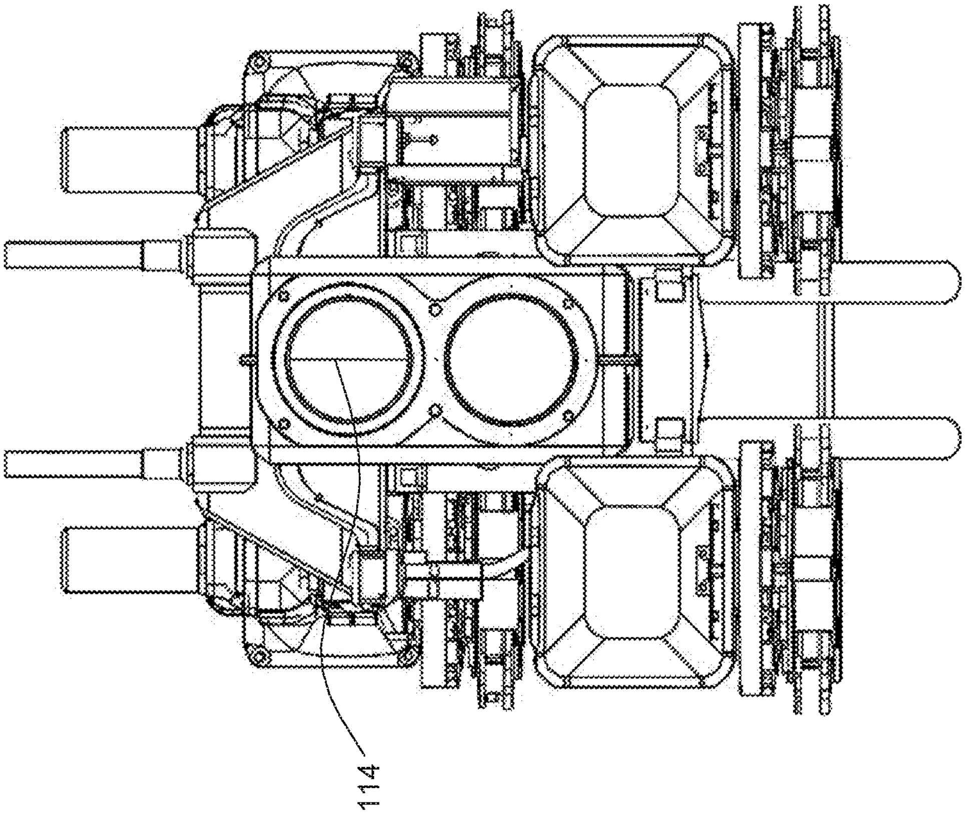
FIG. 2D illustrates an exemplary front view of a proposed aerial vehicle of FIG. 2A, in accordance with an embodiment of the present disclosure.

According to another embodiment and referring to FIG. 1B, the proposed aerial vehicle 100, includes a fuselage 102 having a front end 102*a*, a rear end 102*b*, and a central axis X-X' passing through a centroid of the fuselage 102 and extending between the front end 102*a* and the rear end 102*b*. Further, the aerial vehicle 100 includes a plurality of rotor arms connected to the fuselage. The rotor arms include at least one pair of front rotor arms 104 connected to the fuselage 102 close to the front end 102*a* of the fuselage 102. The rotor arms include at least one pair of rear rotor arms 106 connected to the fuselage 102 close to the rear end 102*b* of the fuselage 102. In some embodiments, in case of hexacopter configuration of the aerial vehicle 100, a pair of central rotor arms may be coupled to the fuselage 102. Further, in case of octacopter configuration of the aerial vehicle 100, two additional pair of rotor arms can be configured to facilitate configuration of eight rotors in the aerial vehicle 100. The additional rotor arms can be the front rotor arms 104, rear rotor arms 106, or the centrally positioned rotor arms.

In addition, the aerial vehicle 100 includes at least two payloads 118-1, 118-2 located on the fuselage 102 in spaced apart locations between the front end 102*a* and the rear end 102*b* of the fuselage 102 resulting the two payloads 118-1, 118-2 to be located at different vertical heights.

In addition, the two payloads 118-1, 118-2 can include a primary payload 118-1 and a secondary payload 118-2. The primary payload 118-1 can be mounted at the front end 102*a* of the fuselage 102. Further, the secondary payload 118-2 can be mounted at a bottom side 102*f* of the fuselage 102 near a Centre of Gravity (COG) of the fuselage 102.

In an embodiment, the connection of the front rotor arms 104 and the rear rotor arms 106 to the respective sides of the fuselage 102 can be such that planes of rotational movement of the front rotor arms 104 and the rear rotor arms 106 can at an angle to the central axis of the fuselage 102.

In an embodiment, the primary payload 118-1 can be an imaging sensor and the secondary payload 118-2 can include, but is not limited to, the imaging sensor like a daylight or thermal imaging camera, Light Detecting and Ranging (LiDAR), radar, or a cargo/deliverable payload, and location of the two payloads 118-1, 118-2 at different vertical heights can prevent obstruction of the field of view of the secondary payload 118-2 by the primary payload 118-2.

In some embodiments, the rotor arms 104, 106 can be pivotally coupled to the fuselage 102. In some embodiments, the rotor arms 104, 106 can be indirectly coupled to the fuselage 102 via an intermediate structure, where the intermediate structure can be mounting plates or a structural frame that can facilitate distribution of the load and provide stability.

In some embodiments, there may be case, where the front rotor arms 104 can be directly coupled to the fuselage 102, while the rear rotor arms 106 can be indirectly connected via the intermediate structure or vice-versa. In some embodiments, the coupling can be pivotable coupling, adjustable coupling, clamped coupling, bolted coupling, and the like, without any limitations.

Conventional drone systems utilize either front-mounted or bottom-mounted payloads, but not both simultaneously, due to challenges in maintaining proper COG, ensuring aerodynamic efficiency, preventing interference between payloads, and managing design complexity. This limitation restricts the versatility and functionality of drones in various applications.

To overcome the above said limitation, the proposed aerial vehicle 100 allows for the effective integration and use of both front and bottom-mounted payloads without compromising stability, performance, or operational efficiency.

As can be appreciated, orientation of the primary payload 108-1 balances the aerial vehicle 100 and the secondary payload 108-2 mounted at or close to the COG of the fuselage 102 carries variable weights such that the variable loads can be carried at the COG of the fuselage 102, thereby making the entire aerial vehicle 100 stable even at different weight with the same configuration of the aerial vehicle 100.

Additionally, both the payloads 108-1, 108-2 can be in different planes ABCD, A'B'C'D' such that one payload cannot block a field of view of the other payload. For instance, the primary payload 108-1 can be attached to the front end 102*a* of the fuselage 102 at a higher plane ABCD such that it balances the entire aerial vehicle 100, whereas the secondary payload 108-2 which can be connected at the or close to the COG of the aerial vehicle's fuselage 102 at a bottom side 102*f* of the fuselage 102 and at a lower plane A'B'C'D' such that the secondary payload 108-2 can carry variable weights and even with variable weights, the entire aerial vehicle 100 can be stable. With the primary payload 108-1 at the higher plane, the aerial vehicle 100 can be properly centred in COG and the secondary payload 108-2 can carry any variable weight at the COG. This ensures that the centre of mass of the secondary payload 108-2 can align with the aerial vehicle's horizontal and vertical centre of gravity axes, thereby maintaining the aerial vehicle's balance and stability during flight operations.

In an embodiment, a top end 102*e* of the fuselage 102 is at the higher plane ABCD than the bottom side 102*f* of the fuselage 102, such that the primary payload 108-1 can be mounted at the higher plane ABCD than the secondary payload 108-2 at the COG of the fuselage 108-2 at the lower plane A'B'C'D'.

In an embodiment, the two payloads 108-1, 108-2 can be tiltable imaging payloads to allow less obstructed view and provide higher range of tilt of the secondary payload 108-2 without being blocked by the primary payload. In another embodiment, the primary payload 108-1 can be a pan and tiltable imaging sensor and the secondary payload 108-2 can be a winching or tether system to carry deliverable cargo.

Thus, the present disclosure overcomes the drawbacks, shortcomings, and limitations associated with the existing aerial vehicles, by providing a compact aerial vehicle 100, which improves stability and control of the aerial vehicle by reducing torsional and shear stresses acting on the fuselage.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present invention overcomes the problems associated with the existing aerial vehicles.

The present invention provides a compact aerial vehicle with foldable rotor arms and landing gears.

The present invention provides an aerial vehicle having rotor arms placed closer to a central line of a fuselage, to reduce torsional stress and shear stress acting on the fuselage.

The present invention provides an aerial vehicle having a pair of front landing gears are longer than a pair of rear landing gears, thereby shortening distance between planes of rotational movements of front rotor arms and rear rotor arms.

The present invention provides an aerial vehicle, front rotor arms are rotated towards a rear end of the fuselage, and rear rotor arms are rotated towards front end of the fuselage, when in folding position, thereby reducing the size of the aerial vehicle for easier packaging.

The present invention enables enhancement of overall stability of the aerial vehicle during take-off, landing and hovering.

The present invention provides an aerial vehicle having a more rigid frame, thereby reducing risk of operation during operation and increasing durability of the aerial vehicle.

We claim:

1. An aerial vehicle (100), comprising:

a fuselage (102) having a front end (102*a*), a rear end (102*b*), and two mutually opposed sides (102*c*, 102*d*) comprising a left side (102*c*) and a right side (102*d*), and extending between the front end (102*a*) and the rear end (102*b*), and a central axis passing through a centroid of the fuselage (102) and extending between the front end (102*a*) and the rear end (102*b*);

a pair of front rotor arms (104) pivotally coupled to the left side and right side (102*d*) of the fuselage (102) proximal to the front end (102*a*) of the fuselage (102); and a pair of rear rotor arms (106) pivotally coupled to the left side and right side (102*d*) of the fuselage (102) proximal to the rear end (102*b*) of the fuselage (102);

landing gears (108) comprising a pair of front landing gears (108-1, 108-2) provided proximal to the front end (102*a*) of the fuselage (102) and a pair of rear landing (108-3, 108-4) gears provided proximal to the rear end (102*b*) of the fuselage (102), wherein the front landing gears (108-1, 108-2) are longer than the rear landing gears (108-3, 108-4) such that, when the aerial vehicle (100) is on the ground, the front end (102*a*) of the fuselage (102) is higher than the rear end (102*b*), and the planes of rotational movement of the pair of front rotor arms (104) and the rear rotor arms (106) are parallel to the ground, wherein the pivotal coupling of the front rotor arms (104) and the rear rotor arms (106) to the respective sides of the fuselage (102) is such that planes of rotational movement of the pair of front rotor arms (104) and the rear rotor arms (106) are at an angle to the central axis (X X') of the fuselage (102).

2. The aerial vehicle (100) as claimed in claim 1, wherein the plane of rotational movement of the pair of front rotor arms (104) is located above the plane of rotational movement of the pair of rear rotor arms (106).

3. The aerial vehicle (100) as claimed in claim 2, wherein each of the front rotor arms (104) and the rear rotor arms (106) is configured to be rotated between an active position, in which rotors (112) on the respective rotor arm is operated for operation of the aerial vehicle (100), and a folded position, in which the aerial vehicle (100) is packed and transported.

4. The aerial vehicle (100) as claimed in claim 3, wherein, for moving the rotor arms to the folded position, the front rotor arms (104) are configured to be rotated towards the rear end (102*b*) of the fuselage (102), and the rear rotor arms (106) are configured to be rotated towards the front end (102*a*) of the fuselage (102), such that, in the folded position, the front rotor arms (104) are located parallel to and above the rear rotor arms, on the two sides of the fuselage (102).

5. The aerial vehicle (100) as claimed in claim 1, wherein each of the rotor arms (104, 106) comprises at least one rotor (112), wherein the rotor (112) is attached to a respective one of the rotor arms such that the rotor faces in a downward direction.

6. The aerial vehicle (100) as claimed in claim 1, wherein the front landing gears (108-1, 108-2) and the rear landing gears (108-3, 108-4) are at least one of foldable and retractable.

7. An aerial vehicle (100), comprising:

a fuselage (102) having a front end (102*a*), a rear end (102*b*), and a central axis passing through a centroid of the fuselage (102) and extending between the front end (102*a*) and the rear end (102*b*);

a plurality of rotor arms (104, 106) connected to the fuselage (102), wherein the plurality of rotor arms (104, 106) comprise at least one pair of front rotor arms (104) connected to the fuselage (102) proximal to the front end (102*a*) of the fuselage (102), and at least one pair of rear rotor arms (106) connected to the fuselage (102) proximal to the rear end (102*b*) of the fuselage (102); landing gears (108) comprising a pair of front landing gears (108-1, 108-2) provided proximal to the front end (102*a*) of the fuselage (102) and a pair of rear landing (108-3, 108-4) gears provided proximal to the rear end (102*b*) of the fuselage (102), wherein the front landing gears (108-1, 108-2) are longer than the rear landing gears (108-3, 108-4) such that, when the aerial vehicle (100) is on the ground, the front end (102*a*) of the fuselage (102) is higher than the rear end (102*b*), and the planes of rotational movement of the pair of front rotor arms (104) and the rear rotor arms (106) are parallel to the ground, wherein the aerial vehicle (100) comprises at least two payloads (118-1, 118-2) located on the fuselage (102) in spaced apart locations between the front end (102*a*) and the rear end (102*b*) of the fuselage (102) resulting the two payloads (118-1, 118-2) to be located at different vertical heights.

8. The aerial vehicle (100) as claimed in claim 7, wherein the two payloads (118-1, 118-2) comprise a primary payload (118-1) mounted at the front end (102*a*) of the fuselage (102) and a secondary payload (118-2) mounted at a bottom side (102*f*) of the fuselage (102) proximate to a center of gravity of the fuselage (102).

9. The aerial vehicle (100) as claimed in claim 8, wherein the primary payload (118-1) is an imaging sensor and the secondary payload (118-2) is selected from any one or combination of: an imaging sensor, Light Detection and Ranging, radar and a cargo, and wherein locations of the two payloads (118-1, 118-2) at the different vertical heights prevents obstruction of the field of view of the secondary payload (118-2) by the primary payload (118-1).

10. The aerial vehicle (100) as claimed in claim 7, wherein the connection of the front rotor arms (104) and the rear rotor arms (106) to the respective sides of the fuselage (102) is such that planes of rotational movement of the pair of front rotor arms (104) and the rear rotor arms (106) are at an angle to the central axis of the fuselage (102).

* * * * *